Jan. 9, 1940.   G. A. GUIDETTI   2,186,483
SADDLE CONNECTION FOR BICYCLES, MOTORCYCLES, AND THE LIKE
Filed Dec. 31, 1937

INVENTOR:
Guido A. GUIDETTI.
ATTYS.

Patented Jan. 9, 1940

2,186,483

UNITED STATES PATENT OFFICE 2,186,483

SADDLE CONNECTION FOR BICYCLES, MOTORCYCLES, AND THE LIKE

Guido Angelo Guidetti, Milan, Italy, assignor to Compagnia Continentale Di Sellerie Ciclistiche Ed Affini, S. A., Milan, Italy Application December 31, 1937, Serial No. 182,697 In Italy January 7, 1937

1 Claim. (Cl. 287—14)

Connections for saddle supports for bicycles and like purposes are known which consist of a small fork support which can be secured at right angles to the tube for the saddle support there being applied to the limbs of said support the two small plates which are secured to the springs of the saddle and which are rendered integral with the small support by means of a radially toothed connection and a tightening bolt.

The object of the present invention relates to a type of saddle support attachment for motorcycles and the like which has great advantages over other known types.

In consists substantially of two small plates or jaws (one a base plate and the other upper one for fixing) between which are tightened the springs of the saddle and wherein the base plate is secured or cast in one piece with a sector of a cylinder the curved surface of which is toothed on the periphery of said cylinder, the surface of which engages with its teeth in a support of corresponding shape the teeth of which are integral with a dowel pin engaging in the tube carrying the saddle and secured to this tube in any appropriate manner. The fixture of the parts forming the attachment is obtained by means of a bolt passing through said parts and capable of being fastened to the small block or plate integral with the saddle pin and serving for the complete fixture of the attachment or connecting means after having set the saddle to the desired angle by means of the relative circular movement of the two toothed parts which can be effected when the bolt is released.

The advantages of this new attachment are:

(a) Greater connecting surface and retaining or gripping surface for the wire forming the saddle spring.

(b) Greater amount of horizontal displacement for the saddle relative to the saddle tube.

(c) Impossibility for the spring to oscillate after tightening of the bolt.

(d) Smaller number of parts forming the connection or vise.

(e) Lesser weight.

(f) Smaller cost of production.

(g) Greater facility of operation for adjusting the position of the saddle.

The accompanying drawing shows, solely by way of example, a method of carrying the invention into effect.

Figure 1:
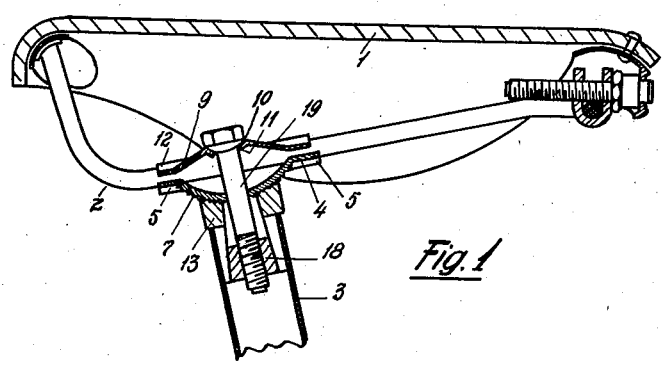
Figure 2:
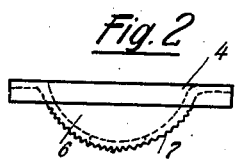
Figure 4:
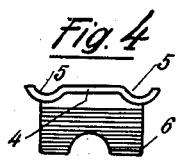
Figure 5:
Figure 6:
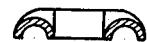
Figure 3:
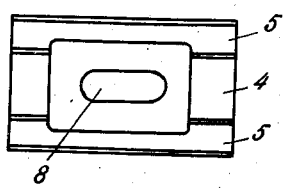
Figure 7:
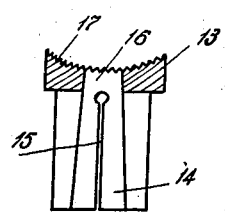
Figure 8:
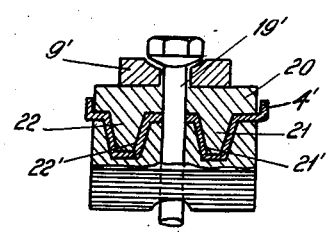

Figure 1 shows, in longitudinal section a saddle fitted with the connection according to the invention; Figs. 2, 3, 4 show respectively in front elevation, plan view and side view the base or lower plate of the connection; Figs. 5, 6 represent respectively in longitudinal section and in side view, the upper or tightening plate of the attachment or connection; Fig. 7 is a partial section of the small toothed support having an expansion sleeve for its fixing to the saddle tube; Fig. 8 shows a cross sectional elevation of the base plate in the case where the spring is replaced by a rigid moulded support.

Reference being had to the accompanying drawing: 1, is the saddle seat; 2 are its springs which in this instance are two in number arranged parallel to each other and comprise a straight portion on which the support can slide, and 3 indicates the saddle tube; by 4 is indicated the jaw of the lower plate of the connection having grooves 5 in which rest the springs 2 of the saddle and consisting at the lower part of a sector of cylinder 6 formed with teeth 7 or grooves directed along a generatrix of the cylindrical surface itself. Said plate has a longitudinal aperture 8. By 9 is indicated the upper jaw or plate of the connection provided with a central recess 10 and a hole 11 passing therethrough which is ovalised in a direction longitudinal to the plate which in addition also has two grooves 12 which are arranged longitudinally and parallel, by means of which the plate carrying the two saddle springs oppositely to the plate 4.

By 13 is indicated the support for fixing to the tube which for this purpose comprises a socket or piece of tube 14 having notches 15 which serve to give it a slight radial elasticity. This support is traversed by a slightly oval hole 16 and in addition comprises a concave upper surface with cylindrical generatrix corresponding to that of the sector 6 which later is provided with teeth 17 likewise corresponding to the teeth 7 of the said sector.

By 18 is indicated a small conical block traversed in axial direction by a screw threaded hole in which engages a bolt 19 serving to secure the whole assembly.

The support 13 can also be arranged without the expansion tube and soldered or welded directly or secured in any manner to the tube 3 through the intermediary of a claw, small disk or block engaging in the sleeve itself and traversed by the screw threaded hole into which the bolt screws.

By appropriate alterations in the shape of the plates 4, 9 without in any way changing the principle of the invention, the saddle supporting springs can be tightened to four wires 2 (juxtaposed in pairs) of any kind having round, oval, square, flat or similar cross section. By the manner of attachment above set out it suffices to release the single bolt of the connection in order to be able to effect the adjustment in inclination and horizontal displacement.

In the case of bicycle saddles for racing purposes, the springs can be replaced by a rigid structure for instance made of moulded aluminium such as 20 with ribs 21, 22 which lodge in channels 21', 22' of appropriate section in the plate 4'; the upper plate is indicated by reference 9' with spherical seat for the bolt 19'.

It is understood that the details of construction in practice can vary from what has been described and shown without exceeding the scope of the invention.

I claim:

A mounting for the saddles of bicycles, motor cycles and the like comprising a saddle frame, an upper plate jaw located above said frame, a lower plate jaw located below said frame, said lower plate jaw being arcuate and having a serrated under surface, a cylindrical block member engaging said lower plate jaw, the upper end of said cylindrical block member being segmental and serrated to co-act with the serrated lower plate jaw, a wedge member engaging in a hole in said cylindrical block and located in the saddle pillar of the vehicle, and a bolt passing through both plate jaws, saddle frame and cylindrical block and screwing into said wedge member securing the saddle in position.

GUIDO ANGELO GUIDETTI.